United States Patent [19]

Kitahara et al.

[11] Patent Number: 4,704,427

[45] Date of Patent: Nov. 3, 1987

[54] METHOD FOR IMPROVING RUBBERS

[75] Inventors: Shizuo Kitahara, Kawaguchi; Fujito Nakakawaji, Yokohama, both of Japan

[73] Assignee: Nippon Zeon Co., Ltd., Tokyo, Japan

[21] Appl. No.: 844,550

[22] Filed: Mar. 27, 1986

[30] Foreign Application Priority Data

Mar. 29, 1985 [JP] Japan .................................. 60-65982

[51] Int. Cl.[4] ................................................ C08F 8/42
[52] U.S. Cl. .................................... 524/531; 524/572; 525/285; 525/329.3; 525/332.8; 525/332.9; 525/333.1; 525/333.2; 525/367; 525/371
[58] Field of Search ....................... 525/367, 371, 285; 524/531, 572

[56] References Cited

U.S. PATENT DOCUMENTS 4,412,041 10/1983 Kitahara et al. ..................... 525/262
4,525,541 6/1985 Kitahara et al. ..................... 525/379

Primary Examiner—Joseph L. Schofer
Assistant Examiner—Bernard Lipman
Attorney, Agent, or Firm—Sherman & Shalloway

[57] ABSTRACT

A method for improving the physical properties of a rubber having —C(CH$_3$)=C— type unsaturated bonds, characterized by subjecting said rubber to two reactions consisting of a modification reaction by Lewis acid and a carboxylation reaction in any desired order.

15 Claims, No Drawings

METHOD FOR IMPROVING RUBBERS

This invention relates to a method for improving a rubber having —C(CH$_3$)=C—type unsaturated bonds. More particularly, the present invention relates to a method for improving a rubber having —C(CH$_3$)=C—type unsaturated bonds, in green strength of carbon-containing unvulcanized blend of said rubber as well as in rebound resiliency of carbon-containing vulcanized blend of said rubber.

In order to obtain a rubber composition having an improved green strength, a method has conventionally been known (Japanese Patent Publication No. 10635/1973) wherein a rubber is reacted with a compound having a carboxyl group, such as maleic anhydride or a hydroxamylchloridic acid (e.g. terephthalohydroxamylchloridic acid).

Also, in order to obtain a rubber composition having an improved rebound resiliency, a method is known (Japanese Patent Laid-Open Publication No. 81301/1984) wherein a polyisoprene rubber is treated with a Lewis acid such as SnCl$_4$.

However, any of the above methods has been unable to attain both of improved green strength and improved rebound resiliency.

Therefore, the object of the present invention resides in providing a rubber material having an improved green strength and an improved rebound resiliency.

The present inventors found that a rubber, when subjected to both of a modification reaction by Lewis acid and a carboxylation reaction, shows such significant improvements in both green strength and rebound resiliency as can not be expected in conventional methods of subjecting a rubber only to a modification reaction by Lewis acid or to a carboxylation reaction.

Thus, according to the present invention there is provided a method for improving a rubber having —C(CH$_3$)=C—type unsaturated bonds, characterized by subjecting said rubber to two reactions consisting of a modification reaction by Lewis acid and a carboxylation reaction in any desired order.

As the rubber having —C(CH$_3$)=C—type unsaturated bonds, used in the present invention (hereinafter this rubber is referred, in some cases, to simply as a or the rubber), there can be mentioned a homopolymer rubber of a conjugated diene (e.g. isoprene, 2,3-dimethylbutadiene), a copolymer rubber of at least two of said conjugated dienes, a copolymer rubber of at least one of said conjugated dienes and at least one other monomer, a ring-opening polymer rubber of a cycloolefin (e.g. cyclopentene, norbornene), a polymer rubber of a cyclic diene (e.g. ethylidenenorbornene, cyclopentadiene), a polyolefin rubber such as a copolymer rubber between at least one of said cyclic dienes and at least one olefin, etc. Specific examples of these rubbers include a polyisoprene rubber, a butyl rubber, a polydimethylbutadiene rubber, a butadiene-isoprene copolymer rubber, an isoprene-styrene copolymer rubber, a butadiene-isoprene-styrene copolymer rubber, a butadiene-isoprene-acrylonitrile copolymer rubber and a styrene-isoprene-styrene block copolymer rubber.

In the modification reaction by Lewis acid of the present invention, a rubber is treated with a Lewis acid in a solution state wherein the rubber is dissolved in an organic solvent, or in the state of a rubber cement right after polymerization. The solvent can be selected freely from aromatic hydrocarbon solvents such as benzene, toluene and the like; paraffinic hydrocarbon solvents such as butane, hexane and the like; cycloparaffinic hydrocarbon solvents such as cyclohexane and the like; and halogenated hydrocarbon solvents such as chloroform, ethylene dichloride and the like. They can be used singly or in combination. Those solvents having an activity toward Lewis acids, such as alcohols, ketones, ethers and the like are restricted in their use amounts. The rubber concentration in the solution is decided appropriately between 1 and 30% by weight. The water content in the solution desirably is 400 ppm or below ordinarily.

The Lewis acid used in the present invention can be those ordinarily known. Typical examples include metal halides and semimetal halides (e.g. halides of such elements as Be, B, Al, Si, P, S, Ti, V, Fe, Zn, Ga, Ge, As, Se, Zr, Nb, Mo, Cd, Sn, Sb, Te, Ta, W, Hg, Bi and U, as well as halides of such oxides as PO, SeO, SO, SO$_2$ and VO), organic halides and complexes thereof. Specifically there are mentioned BF$_3$, (CH$_3$)$_2$BF, AlCl$_3$, AlBr$_3$, (C$_2$H$_5$)AlCl$_2$, POCl$_3$, TiCl$_4$, VCl$_4$, MoCl$_6$, (CH$_3$)SnCl$_3$, TeBr$_4$, etc. Particularly preferable are BF$_3$(C$_2$H$_5$)$_2$, SnCl$_4$, SbCl$_5$, WCl$_6$, SnBr$_4$, BCl$_3$, TeCl$_4$, etc.

The amount of the Lewis acid required for the modification is greatly affected by the kind of the solvent in the rubber solution or by water and other impurities present in the rubber solution and hence can not be specified generally. However, the amount ordinarily is 0.1 to 5 parts by weight, preferably 0.5 to 3 parts by weight per 100 parts by weight of the rubber. It is possible to substantially reduce the amount of the Lewis acid by together using an appropriate amount (e.g. 0.1 to 25 parts by weight, preferably 0.5 to 10 parts by weight per 100 parts by weight of the rubber) of a compound known as a cationic polymerization catalyst (e.g. a compound having active halogen such as trichloroacetic acid, tribromoacetic acid, water plus methyl alcohol, 2,4-dinitrophenol, p-nitrophenol or the like, or an organic compound having active halogen such as t-butyl chloride, triphenylmethane chloride, benzyl chloride or the like). The use of such a co-catalyst is also effective for the suppression of gel generation. The reaction temperature used in the modification reaction by Lewis acid is not particularly restricted but ordinarily is —20° to 100° C., preferably 10° to 60° C. The reaction time is not particularly restricted, either, but ordinarily is selected appropriately between 2 minutes and 10 hours.

The carboxylation reaction used in the present invention is not particularly restricted. It includes all reactions capable of introducing, using a modifier, carboxyl groups into a rubber in a solution state or in a rubber kneader without using any solvent. Specific example of these reactions are a maleic anhydride addition reaction in the presence of heat or a peroxide (CA '79 (2) 6443 Z); a method of reacting a rubber with a hydroxyamylchloridic acid such as terephthalohydroxyamylchloridic acid, oxyiminochloroacetic acid or the like (Japanese Patent Laid-Open Publication No. 10635/1973); a 3-carboxyphenylmaleimide addition reaction (Kauch. Rezina 1974 8-10 Chavichich, et al); a method of reacting a rubber with carbon monoxide in the presence of a metal carbonyl compound to introduce carboxyl groups into the rubber (CA '77 (12) 762989); and a carboxylation reaction using 4-carboxylphenyl-1,2,4-triazoline-3,5-dione (Japanese Patent Laid-Open Publication No. 86477/1974).

The solvent and reaction conditions (temperature, pressure and time) used in the carboxylation reaction can be selected from those used in the modification reaction by Lewis acid. Specifically, the conditions mentioned in the literatures and patents cited previously can appropriately be used depending upon the conditions of the carboxylation reaction adopted.

The use amount of the above mentioned modifier in the carboxylation reaction is not particularly restricted but usually is 0.01 to 20 parts by weight, preferably 0.1 to 10 parts by weight, per 100 parts by weight of the rubber.

In the present invention method for improving a rubber, a rubber is subjected to two reactions consisting of a modification reaction by Lewis acid and a carboxylation reaction in any desired order. There can be mentioned the following four typical methods.

(1) A method wherein (a) a rubber is subjected firstly to a modification reaction by Lewis acid in a solution state [industrially in the state of a rubber cement right after polymerization (this applies also to (2) to (4))] and then to a carboxylation reaction, or, (b) a rubber is subjected firstly to a carboxylation reaction and then to a modification reaction by Lewis acid.

(2) A method wherein a rubber is subjected to a modification reaction by Lewis acid in a solution state, a small amount (1 to 20 moles per 1 mole of the Lewis acid used) of an alcohol or acetone is added to stop the reaction, and then the rubber is subjected to a carboxylation reaction.

(3) A method wherein a rubber is subjected to a modification reaction by Lewis acid, a large amount of an alcohol, hot water or the like is added to stop the reaction and simultaneously to coagulate the reacted rubber, and then the coagulated rubber is subjected to a carboxylation reaction as it is or in a solution state.

(4) A method wherein a rubber is subjected to a carboxylation reaction as it is or in a solution state and then the reacted rubber is subjected to a modification rubber by Lewis acid in the state of the reaction mixture per se or in the state of a newly prepared solution.

The reaction mixture obtained in the above reaction is mixed with a large amount of an alcohol, hot water or the like to stop the reaction and simultaneously to coagulate the reacted rubber, after which the coagulated rubber is washed and dried to obtain an improved rubber.

The conditions of improvement reactions (modification reaction plus carboxylation reaction) used in the present invention are desirably selected so that the glass transition temperature and Wallace plasticity of the improved rubber become higher by 0.3° to 2.7° C. and 2 to 35 points, respectively, than those of the unreacted rubber. When the increase of the glass transition temperature or Wallace plasticity of the treated rubber is smaller than the above range, the treated rubber is not sufficiently improved in rebound resiliency and heat built-up. When the increase is larger than the above range, the treated rubber has decreased rebound resilience and increased heat built-up, thus having deteriorated characteristics. It is also preferable that the conditions of the modification reaction by Lewis acid be selected so that the amount of the gel generated is as little as possible. When the amount of the gel generated is very large (e.g. 10% or more) compared with that of the untreated rubber, the processability of the treated rubber is reduced.

When the improved rubber is mixed with ordinary compounding agents for rubbers (e.g. a vulcanizing agent, a vulcanizing accelerator, a vulcanizing aid, a reinforcing agent and a softener), and if necessary, also with ordinary rubbers, the resulting unvulcanized blend has an excellent green strength and consequently very good moldability. The blend, particularly, the blend containing carbon black, when vulcanized, is excellent in strength characteristics, rebound resiliency, etc. and accordingly is used not only in general applications but also particularly preferably in those applications requiring said properties, such as tire carcass and tread, rubber vibration insulators and the like. The improved rubber obtained from the present invention method can also be used in ordinary latex applications, in the form of a latex.

Next, the present invention will be explained specifically by way of Examples. In each Example, the analysis of improved rubber, the preparation of unvulcanized and vulcanized rubber blends of improved rubber and the testing of physical properties of these blends were conducted as follows.

Glass Transition Temperature

Measurement by a high sensitivity differential scanning colorimeter (DSC) (Model SSC-560 manufactured by Daini Seikosha) was conducted to obtain a curve. The inflection point of the curve was used as a glass transition temperature of the tested rubber sample.

Wallace Plasticity

It was measured at 100° C. using a Wallace rapid plastometer.

Amount of Carboxyl Group Introduced Into Rubber

It was measured by a neutralization titration method after the low molecular components present in the treated rubber have been removed by purification.

Preparation of Unvulcanized Rubber Blend

The materials shown in the following compounding formulation, other than sulfur and the vulcanization accelerator, were kneaded in a small Banbury mixer. To the resulting mixture were added sulfur and the vulcanization accelerator on a small roll, and they were kneaded to obtain an unvulcanized rubber blend.

| Compounding formulation (Examples 1 and 2) | | |
|---|---|---|
| Rubber (treated) | 100 | parts by weight |
| HAF carbon | 50 | |
| Aromatic oil | 5 | |
| Zinc oxide | 5 | |
| Stearic acid | 2 | |
| Sulfur | 2.5 | |
| N—oxydiethylene-2-benzothiazylsulfeneamide (vulcanization accelerator) | 0.8 | |
| N—isopropyl-N'—phenyl-p-phenylenediamine | 1.0 | |
| Compounding formulation (Example 3) | | |
| Butyl rubber (Exxon Butyl 268) (treated) | 100 | parts by weight |
| HAF carbon | 50 | |
| Sulfur | 1.5 | |
| Tetramethylthiuram disulfide (vulcanization accelerator) | 1.0 | parts by weight |
| 2-Mercaptobenzothiazole (vulcanization accelerator) | 0.5 | |

Green Strength

An unvulcanized rubber blend was press-molded at 100° C. for 5 minutes to prepare an unvulcanized rubber sheet of 2 mm in thickness. Dumbbell-shaped specimens meeting JIS K 6301 No. 3 were punched from the rubber sheet and subjected to a tensile test at 25° C. at a pulling rate of 500 mm/min to measure a tensile stress at 500% elongation.

Tensile Test

An unvulcanized rubber blend was subjected to press vulcanization at 145° C. (160° C. for an unvulcanized butyl rubber blend) for a predetermined time to obtain a 2 mm thick sheet. Dumbbell-shaped specimens meeting JIS K 6301 No. 3 were punched from the sheet and subjected to a tensile test at 25° C. at a pulling rate of 500 mm/min.

Rebound Resiliency

It was measured at 25° C. using a Dunlop tripsometer on a vulcanized rubber blend obtained by heating an unvulcanized rubber blend at 145° C. (160° C. for an unvulcanized butyl rubber blend) for a predetermined time.

EXAMPLE 1

160 g of a polyisoprene rubber (cis—1,4 bond=98%) was dissolved in 4 liters of dehydrated benzene and placed in a sealed glass vessel (a separable flask). Thereto were added the Lewis acid and the co-catalyst both specified in Table 1, each as a benzene solution, and the whole mixture was subjected to a reaction with stirring, at 25° C. in a nitrogen atmosphere under the conditions specified in Table 1. 100 ml of methanol was added to stop the reaction. Subsequently, the acid compound specified in Table 2 was added as a methanol solution (100 ml), followed by addition of triethylamine. The resulting mixture was subjected to a reaction at 60° C. for 3 hours. The reaction mixture was poured into 8 liters of methanol containing 20 ml of 36% hydrochloric acid to coagulate the treated rubber. The coagulated rubber were made into fine pieces and washed. Then, this treated rubber in fine pieces was immersed in 3 liters of methanol containing 2 g of an oxidation inhibitor (2,6-ditertiarybutyl-4-methylphenol), washed and dried in a vacuum drier for 24 hours, whereby the samples A, B, C and D according to the present invention were obtained.

Comparative samples E and F were obtained in the same manner as above except that either the carboxylation reaction or the modification reaction by Lewis acid was not conducted.

TABLE 1

| Sample | Type of Lewis acid | Amount of Lewis acid (mM) | Type of co-catalyst | Amount of co-catalyst (mM) | Reaction temperature (°C.) | Reaction time (min) |
| --- | --- | --- | --- | --- | --- | --- |
| A | $SnCl_4$ | 8 | $CCl_3COOH$ | 8 | 25 | 26 |
| B | $BF_3O(C_2H_5)_2$ | 10 | MeOH | 10 | 25 | 60 |
| C | $SnCl_4$ | 15 | t-BuCl | 15 | 25 | 45 |
| D | $SnCl_4$ | 30 | — | — | 25 | 30 |
| E | $SnCl_4$ | 8 | $CCl_3COOH$ | 8 | 25 | 25 |
| F | — | — | — | — | — | — |

TABLE 2

| Sample | Type and amount (g) of acid compound | | Amount of triethylamine (g) |
| --- | --- | --- | --- |
| A | Terephthalohydroxamylchloridic acid | 2.4 | 2.4 |
| B | Same as above | 1.6 | 1.6 |
| C | Oxyiminochloroacetic acid | 0.8 | 0.8 |
| D | Same as above | 3.2 | 3.2 |
| E | — | — | — |
| F | Terephthalohydroxamylchloridic acid | 2.4 | 2.4 |

Unvulcanized and vulcanized blends of each sample and the untreated polyisoprene rubber were measured for physical properties. The results are shown in Table 3.

As is appreciated from Table 3, the samples A, B, C and D according to the present invention, as compared with the comparative samples E and F and the untreated polyisoprene rubber, are markedly improved in green strength and rebound resiliency.

TABLE 3

| Sample | Rubber wallace plasticity | Glass transition temperature (°C.) | Amount of carboxyl group introduced (mole/100 g rubber) | Physical properties of unvulcanized blend | | Vulcanization time (min) | Physical properties of vulcanized blend | | | |
| --- | --- | --- | --- | --- | --- | --- | --- | --- | --- | --- |
| | | | | Wallace plasticity | Green strength (kg/cm²) | | 300% stress (kg/cm²) | Tensile strength (kg/cm²) | Elongation (%) | Rebound resiliency (%) |
| This invention | | | | | | | | | | |
| A | 64 | −61.3 | 0.005 | 43 | 71 | 26 | 140 | 280 | 550 | 74 |
| B | 58 | −62.0 | 0.003 | 44 | 55 | 26 | 140 | 290 | 550 | 72 |
| C | 56 | −62.2 | 0.002 | 45 | 33 | 25 | 135 | 280 | 540 | 72 |
| D | 60 | −61.7 | 0.007 | 42 | 108 | 26 | 155 | 275 | 480 | 77 |
| Comparison | | | | | | | | | | |
| E | 64 | −61.3 | — | 43 | 4.4 | 25 | 130 | 280 | 500 | 68 |
| F | 48 | −62.8 | 0.005 | 42 | 29 | 24 | 140 | 280 | 530 | 66 |
| Untreated polyisoprene rubber | 46 | −62.8 | — | 43 | 2.1 | 22 | 130 | 280 | 570 | 63 |

EXAMPLE 2

160 g of a polyisoprene rubber (cis—1,4 bond=98%) was dissolved in 4 liters of dehydrated toluene and placed in a sealed glass vessel (a separable flask). Thereto were added the Lewis acid and the co-catalyst both specified in Table 4, each as a toluene solution, and the whole mixture was subjected to a reaction with stirring, at 25° C. in a nitrogen atmosphere under the conditions specified in Table 4. 100 ml of ethanol was added to stop the reaction. Subsequently, the compound(s) specified in Table 5 was (were) added and the resulting mixture was subjected to a reaction under the conditions specified in Table 5. The reaction mixture was poured into 8 liters of methanol to coagulate the treated rubber. The coagulated rubber was made into fine pieces and washed. This rubber in fine pieces was immersed in 3 liters of methanol containing 2 g of an oxidation inhibitor (2,6-ditertiarybutyl-4-methylphenol), washed and dried in a vacuum drier for 24 hours, whereby the samples G and H shown in Table 6 were obtained.

Comparative samples I and J were obtained in the same manner as above except that either the carboxylation reaction or the modification reaction by Lewis acid was not conducted.

These samples were subjected to the same measurements as in Example 1. As shown in Table 6, the same results as in Example 1 were obtained.

specified in Table 7, each as a benzene solution, and the whole mixture was subjected to a reaction with stirring, at 25° C. in a nitrogen atmosphere under the conditions specified in Table 7. 100 ml of methanol was added to stop the reaction. Subsequently, the compounds specified in Table 8 were added and the resulting mixture was subjected to a reaction at 60° C. for 3 hours. The reaction mixture was poured into 8 liters of methanol containing 20 ml of 36% hydrochloric acid to coagulate the treated rubber. The coagulated rubber was made into fine pieces and washed. This treated rubber in fine pieces was immersed in 3 liters of methanol containing 2 g of an oxidation inhibitor (2,6-ditertiarybutyl-4-methylphenol), washed and dried in a vacuum drier for 24 hours, whereby a sample K was obtained.

Comparative samples L and M were obtained in the same manner as above except that either the carboxylation reaction or the modification reaction by Lewis acid was not conducted.

These samples were subjected to the same measurements as in Example 1.

As shown in Table 9, the same results as in Example 1 were obtained.

TABLE 4

| Sample | Type of Lewis acid | Amount of Lewis acid (mM) | Type of co-catalyst | Amount of co-catalyst (mM) | Reaction temperature (°C.) | Reaction time (min) |
|---|---|---|---|---|---|---|
| G | $SnCl_4$ | 6.8 | $CCl_3COOH$ | 6.8 | 25 | 60 |
| H | $SnCl_4$ | 6.0 | $CBr_3COOH$ | 6.0 | 25 | 45 |
| I | $SnCl_4$ | 6.8 | $CCl_3COOH$ | 6.8 | 25 | 60 |
| J | — | — | — | — | — | — |

TABLE 5

| Sample | Amount of maleic anhydride (g) | Amount of benzoyl peroxide (g) | Reaction temperature (°C.) | Reaction time (hours) |
|---|---|---|---|---|
| G | 8 | — | 100 | 5 |
| H | 2 | 0.02 | 60 | 1 |
| I | — | — | — | — |
| J | 8 | — | 100 | 5 |

TABLE 7

| Sample | Amount of $SnCl_4$ (mM) | Amount of trichloroacetic (mM) | Reaction (min) | Reaction temperature (°C.) |
|---|---|---|---|---|
| K | 8 | 8 | 60 | 30 |
| L | 8 | 8 | 60 | 30 |
| M | — | — | — | — |

TABLE 6

| Sample | Rubber wallace plasticity | Glass transition temperature (°C.) | Amount of carboxyl group introduced (mole/100 g rubber) | Physical properties of unvulcanized blend Wallace plasticity | Physical properties of unvulcanized blend Green strength (kg/cm$^2$) | Vulcanization time (min) | Physical properties of vulcanized blend 300% stress (kg/cm$^2$) | Physical properties of vulcanized blend Tensile strength (kg/cm$^2$) | Physical properties of vulcanized blend Elongation (%) | Physical properties of vulcanized blend Rebound resiliency (%) |
|---|---|---|---|---|---|---|---|---|---|---|
| This invention | | | | | | | | | | |
| G | 61 | −61.7 | 0.002 | 44 | 38 | 26 | 145 | 280 | 520 | 72 |
| H | 59 | −61.9 | 0.0015 | 46 | 28 | 24 | 143 | 280 | 520 | 70 |
| Comparison | | | | | | | | | | |
| I | 61 | −61.7 | — | 46 | 4.0 | 25 | 135 | 280 | 540 | 67 |
| J | 48 | −62.8 | 0.002 | 48 | 16 | 26 | 150 | 280 | 490 | 64 |
| Untreated polyisoprene rubber | 46 | −62.8 | — | 43 | 2.1 | 22 | 130 | 280 | 570 | 63 |

EXAMPLE 3

100 g of a butyl rubber (Exxon Butyl 268 having an unsaturation degree of 1.5 to 2.0%, manufactured by Exxon Chemical) was dissolved in 4 liters of dehydrated benzene and placed in a sealed glass vessel (a separable flask). Thereto were added the compounds

TABLE 8

| Sample | Amount of terephthalohydroxamylchloridic acid (g) | Amount of triethylamine (g) |
|---|---|---|
| K | 1.0 | 1.0 |
| L | — | — |
| M | 1.0 | 1.0 |

TABLE 9

| Sample | Rubber Mooney viscosity $M_{1+8}$ (125° C.) | Glass transition temperature (°C.) | Amount of carboxyl group introduced (mole/100 g/rubber) | Physical properties of unvulcanized blend Green strength (kg/cm$^2$) | Vulcanization time (min) | Physical properties of vulcanized blend Rebound resiliency (%) |
|---|---|---|---|---|---|---|
| *K Comparison | 55 | −60.5 | 0.002 | 68 | 22 | 38 |
| L | 55 | −60.5 | — | 52 | 22 | 35 |
| M | 50 | −61.0 | 0.002 | 60 | 20 | 35 |
| Untreated butyl rubber | 50 | −61.0 | — | 50 | 20 | 33 |

*This invention

We claim:

1. A method for modifying a rubber having —C(CH$_3$)=C—type unsaturated bonds to both improve the green strength of the rubber in the unvulcanized state and increase rebound resiliency of the rubber in the vulcanized state, said method comprising subjecting the rubber to a modification reaction with from 0.1 to 5 parts by weight, per 100 parts by weight of the rubber, of a Lewis acid in the presence of a cocatalytic amount of a cationic polymerization catalyst having active hydrogen or active halogen, said cationic polymerization catalyst being selected from the group consisting of trichloroacetic acid, tribromoacetic acid, water plus methyl alcohol, 2,4-dinitrophenol, p-nitrophenol, t-butyl chloride, triphenylmethane chloride and benzyl chloride, and also subjecting the rubber to a carboxylation reaction by reacting the rubber with from 0.01 to 20 parts by weight, per 100 parts by weight of the rubber, of a modifier capable of introducing carboxyl groups into the rubber, said modifier being selected from the group consisting of maleic anhydride, hydroxamylchloridic acid, 3-carboxyphenylmaleimide, carbon monoxide in the presence of a metal carbonyl compound, and 4-carboxylphenyl-1,2,4-triazoline-3,5-dione, and said modification reaction and said carboxylation reaction each being conducted at a temperature in the range of from −20° C. to 100° C.

2. A method according to claim 1 wherein the rubber having —C(CH$_3$)=C—type unsaturated bonds is selected from a homopolymer rubber of a conjugated diene, a copolymer rubber of at least two conjugated diene, a copolymer rubber of at least one conjugated diene and at least one other monomer, a ring-opening polymer rubber of a cycloolefin, a polymer rubber of a cyclic diene and a polyolefin rubber.

3. A method according to claim 1 wherein the modification reaction by Lewis acid is conducted in the presence of a solvent.

4. A method according to claim 1 wherein the Lewis acid is a metal halide or a semimetal halide.

5. A method according to claim 1 wherein the conditions of the modification reaction and the carboxylation reaction are selected so that the glass transition temperature and Wallace plasticity of the reacted rubber become higher by 0.3° to 2.7° C. and 2 to 35 points, respectively, than those of the unreacted rubber.

6. A rubber composition comprising a rubber obtained from claim 1 and carbon black.

7. A method according to claim 1 wherein the rubber having —C(CH$_3$)=C—type unsaturated bonds is a polyisoprene rubber, a butyl rubber, a polydimethylbutadiene rubber, a butadiene-isoprene copolymer rubber, an isoprene-styrene copolymer rubber, a butadiene-isoprene-styrene copolymer rubber, a butadiene-isoprene-acrylonitrile copolymer rubber or a styrene-isoprene-styrene block copolymer rubber.

8. A method according to claim 3 wherein the solvent is an aromatic hydrocarbon solvent, paraffinic hydrocarbon solvent, cycloparaffinic hydrocarbon solvent, halogenated hydrocarbon solvent, or mixture thereof.

9. A method according to claim 1 wherein the amount of Lewis acid is from 0.5 to 3 parts by weight, per 100 parts by weight of the rubber.

10. A method according to claim 1 wherein the compound having active hydrogen or active halogen is used in an amount of from 0.1 to 25 parts by weight, per 100 parts by weight of the rubber.

11. A method according to claim 1 wherein the compound having active hydrogen or active halogen is used in an amount of from 0.5 to 10 parts by weight, per 100 parts by weight of the rubber.

12. A method according to claim 1 wherein each of said modification reaction and carboxylation reaction is conducted at a temperature in the range of from 10° C. to 60° C.

13. A method according to claim 1 wherein the modifier capable of introducing carboxyl groups into the rubber is used in an amount of from 0.1 to 10 parts by weight, per 100 parts by weight of the rubber.

14. A method according to claim 1 wherein the rubber is first subjected to the modification reaction and is then subjected to the carboxylation reaction.

15. A method according to claim 1 wherein the rubber is first subjected to the carboxylation reaction and is then subjected to the modification reaction.

* * * * *